Jan. 22, 1952   J. S. ECKERT   2,583,329
METHOD AND APPARATUS FOR GIVING AN INTERNAL GLOSS
FINISH TO A TUBE OF HEAT PLASTIC MATERIAL
Filed May 8, 1948
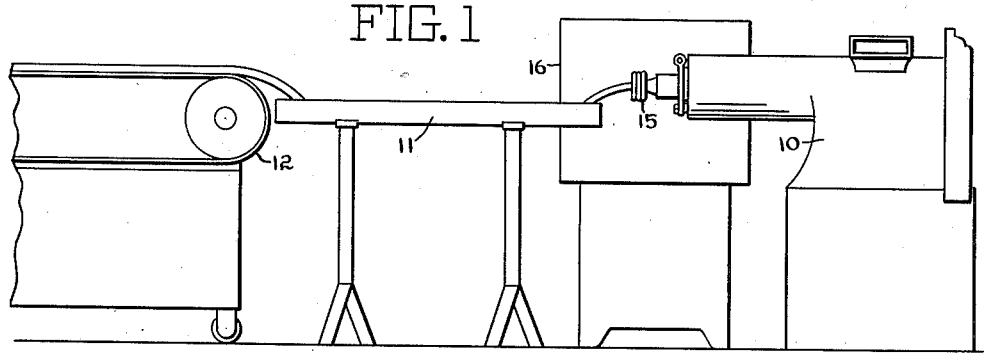
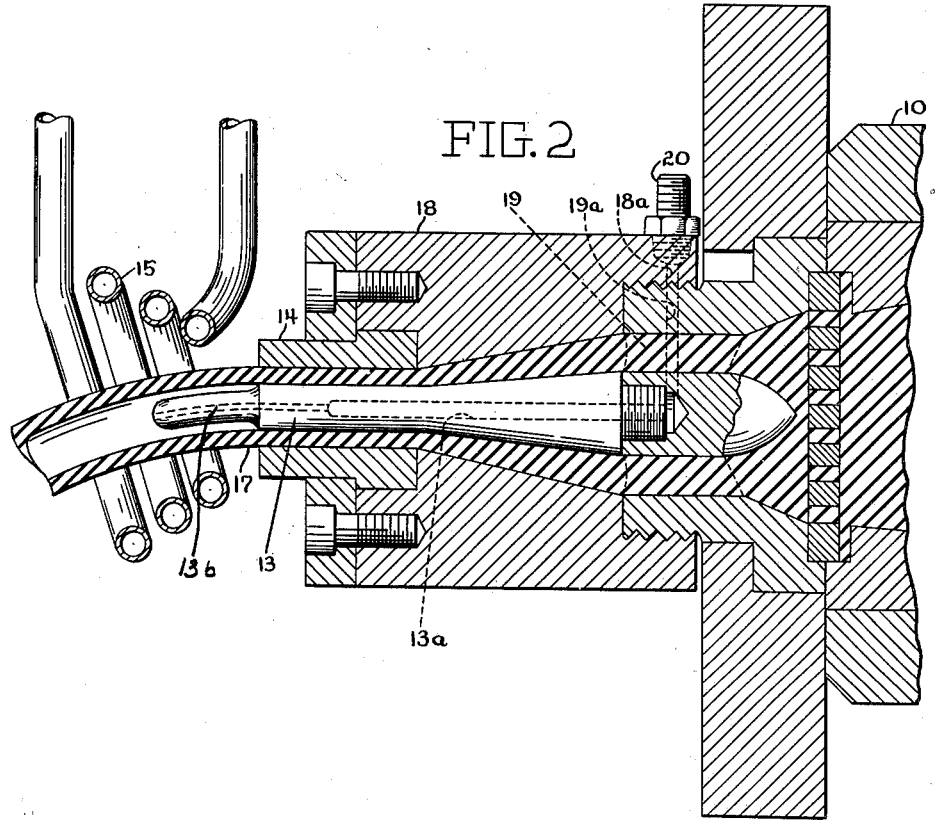
INVENTOR.
JOHN S. ECKERT
BY Willard D. Eakin
Attorney Patented Jan. 22, 1952

2,583,329

UNITED STATES PATENT OFFICE 2,583,329

METHOD AND APPARATUS FOR GIVING AN INTERNAL GLOSS FINISH TO A TUBE OF HEAT PLASTIC MATERIAL

John S. Eckert, Kent, Ohio, assignor to The United States Stoneware Company, Akron, Ohio, a corporation of Ohio Application May 8, 1948, Serial No. 25,958

7 Claims. (Cl. 18—14)

1

This invention relates to apparatus and procedure for forming tubing or the like from a heat-plastic stock, such as a vinyl resin, by extrusion, and giving the surface of the product a smooth gloss finish, as in giving such a finish to the inner surface of a tube, to make it sanitary and easy to clean, for the handling of liquid food products, for example, and to give the tube better transparency than it would have without such a finish.

Its chief objects are to provide a method and apparatus adapted to give a gloss finish to such a product in an improved manner, and especially to give such a finish to the inner surface of a tube formed by extrusion.

Of the accompanying drawings:

Fig. 1 is a side elevation of apparatus embodying and adapted for the practice of my invention in its preferred form.

Fig. 2 is a longitudinal middle section, on a larger scale, of parts of the extruder and the stock being operated upon and preferred means for providing the internal gloss finish.

The apparatus comprises an extruder 10, which can be of standard type except as hereinafter described, a cooling tank 11, through which the tubed stock is continuously drawn as it emerges from the extruder, and an endless-belt conveyor 12 for drawing the tube through the cooling tank and conveying it therefrom for further handling.

The mandrel of the tube machine is shown at 13 and I provide the gloss finish on the inner surface of the tube by maintaining the mandrel at a suitably high temperature in the part of it that is last contacted by the emerging tube.

This is done preferably by employing a mandrel which extends beyond the delivery end of the die, 14, and by heating the projecting portion of the mandrel by high-frequency induction, by surrounding it with a primary coil 15 which is a part of a high-frequency induction heater 16 (Fig. 1), which can be of standard construction.

The coil 15 is here shown as being made of copper tubing, for high conductivity and for circulating cooling water through it if necessary or desirable.

Preferably the projecting portion 13b of the mandrel is of less than full shaping diameter, to avoid contact of it with the stock, as its temperature may be so high as to damage the stock, although conduction of heat from it to the shaping portion of the mandrel maintains the latter at a temperature only sufficiently high to provide the gloss finish without damage to the stock.

As a further precaution against damaging contact of the small-diameter projecting portion of the mandrel with the stock it can have a downwardly curved form, as shown, so that it will be at all positions substantially centered in the extruded tube, 17, as the latter curves downward into the cooling tank.

Also it may be desirable, for accurate control of the temperature of the shaping portion of the mandrel, to provide for passing a cooling fluid such as air through it, and through the tube, and this can be done by providing, as a series of connecting passages constituting an air conduit, a hole 18a in the nozzle 18 of the tuber, a hole 19a in the ring and one of the arms of the spider 19, and a hole 13a in the mandrel.

A pipe fitting or hose nipple 20 can be mounted as shown for connecting the conduit with a source (not shown) of air under suitable pressure. Passage of air from the mandrel into the tube has a cooling effect upon the inner surface of the tube adjacent the position where it receives its gloss finish, and avoids developing of any collapsing partial vacuum in the tube.

The mode of operation has been brought out in the foregoing description.

Substantial modifications are possible within the scope of the invention as defined by the appended claims.

I claim:

1. An extruder assembly comprising a die and an extrusion mandrel defining an annular extrusion space and means for heating the mandrel by induction, the induction-heating means being so constructed and arranged as to heat to the highest temperature the end portion of the mandrel that is farthest in the direction of extrusion.

2. An extruder assembly comprising a die and an extrusion mandrel defining an annular extrusion space and means for heating the mandrel by induction, the mandrel projecting beyond the delivery aperture of the die and the heating means comprising a primary induction coil surrounding the projecting portion of the mandrel.

3. An extruder assembly comprising a die and an extrusion mandrel defining an annular extrusion space and means for heating the mandrel by induction, the mandrel having a terminal portion of less than shaping cross-sectional size projecting beyond the delivery aperture of the die and the heating means comprising a primary induction coil surrounding the said projecting portion of the mandrel.

4. An extruder assembly comprising a die and an extrusion mandrel defining an annular extrusion space and means for heating the mandrel by induction, the mandrel having a downwardly curved terminal portion projecting beyond the delivery aperture of the die and the heating means comprising a primary induction coil surrounding the said projecting portion of the mandrel.

5. An extruder assembly comprising a die and an extrusion mandrel defining an annular extrusion space and means for heating the mandrel by induction, the mandrel having a downwardly curved terminal portion projecting beyond the delivery aperture of the die and the heating means comprising a primary induction coil surrounding the said projecting portion of the mandrel, and said projecting portion being of less than shaping cross-sectional size.

6. Apparatus for giving a gloss finish to the inner face of a tube of heat plastic material, said apparatus comprising a finishing tool, means for effecting relative movement of the tube and the tool with the latter within the tube, and means for heating the tool by induction, the said means for effecting the said relative movement and the said means for heating the tool having such relative effectiveness as to impart the gloss finish without heat-disintegration of the material of the tube.

7. An extruder assembly comprising an extrusion die and an extrusion mandrel defining an annular extrusion space, the mandrel having a portion projecting from the delivery end of the die into the off-running tube being formed, said projecting portion of the mandrel being adapted to be heated by induction and being of such less radial extent than the shaping part of the mandrel as not to contact the adjacent inner surface of the tube, and induction means for heating the said projecting portion of the mandrel.

JOHN S. ECKERT.

REFERENCES CITED

The following references are of record in the file of this patent:

UNITED STATES PATENTS

| Number | Name | Date |
|---|---|---|
| 1,159,895 | Canda | Nov. 9, 1915 |
| 1,368,658 | Royle | Feb. 15, 1921 |
| 1,657,132 | Merle | Jan. 24, 1928 |
| 1,925,545 | Royle | Sept. 5, 1933 |
| 1,986,544 | Theuer | Jan. 1, 1935 |
| 2,177,633 | Blackard | Oct. 31, 1939 |
| 2,258,025 | Morris et al. | Oct. 7, 1941 |

FOREIGN PATENTS

| Number | Country | Date |
|---|---|---|
| 173,082 | Germany | July 16, 1906 |
| 343,434 | Great Britain | Feb. 9, 1931 |